United States Patent [19]

Hållstedt

[11] Patent Number: 5,653,935
[45] Date of Patent: Aug. 5, 1997

[54] METHOD FOR MANUFACTURING A THERMOPLASTIC PIPE

[75] Inventor: Göran Hållstedt, Forsheda, Sweden

[73] Assignee: Forsheda AB, Forsheda, Sweden

[21] Appl. No.: 450,365

[22] Filed: May 25, 1995

[30] Foreign Application Priority Data

Jun. 3, 1994 [SE] Sweden .......................... 9401935

[51] Int. Cl.⁶ .................................................. B29C 61/02
[52] U.S. Cl. .......................... 264/516; 264/230; 264/909; 425/393
[58] Field of Search ........................... 264/516, 296, 264/230, 342 R, 909; 425/393

[56] References Cited

U.S. PATENT DOCUMENTS

| | | | |
|---|---|---|---|
| 3,544,672 | 12/1970 | Goda et al. | 264/230 |
| 3,887,674 | 6/1975 | Oostenbrink | 425/393 |
| 4,369,159 | 1/1983 | Irmer | 264/296 |
| 4,386,045 | 5/1983 | Vaisanen | 264/296 |
| 4,395,379 | 7/1983 | Herder | 264/573 |
| 4,625,383 | 12/1986 | Vassallo et al. | 264/516 |

FOREIGN PATENT DOCUMENTS 56-98123  8/1981  Japan .................................. 264/909

*Primary Examiner*—Catherine Timm
*Attorney, Agent, or Firm*—Baker & Daniels

[57] ABSTRACT

In a method for manufacturing a thermoplasic pipe a pipe-shaped blank having larger wall thickness and less diameter than the completed thermoplastic pipe is positioned in a cylindrical chamber. The blank is formed by being softened and expanded into engagement with the inner surface of the chamber. A sealing ring is then mounted in an end portion of the plastic pipe by positioning the sealing ring in the expanded blank and shrinking the blank around the sealing ring by heating the pipe end portion.

14 Claims, 2 Drawing Sheets

METHOD FOR MANUFACTURING A THERMOPLASTIC PIPE

The present invention relates to a method for manufacturing a thermoplastic pipe having at at least one end portion a sealing ring mounted in an inner groove in the end portion.

A plastic pipe of the kind manufactured according to the method of the invention can be connected with a pipe of the same kind by introducing the end portion of the other pipe into the end portion provided with the sealing ring, the outer surface of the end portion of the other pipe thereby sealingly engaging the sealing ring. In the case that the pipes which shall be connected with each other are of the same diameter the end portion provided with the sealing ring is formed as a socket, i.e. as an end portion having a larger diameter, into which an end portion having the same diameter as the main part of the pipe can be introduced. Thermoplastic pipes of said kind can be manufactured in many different ways, for example by extrusion of a continuous pipe length which is divided into sections and which by heating and expansion of the end portion is at one end provided with a socket. Thereby, the socket is formed with an inner groove by means of a mandrel which is introduced into the softened pipe end portion and provides the inner surface of the socket and the groove arranged therein with good tolerances.

In order to manufacture thermoplastic pipes which have a better strength in relation to their wall thickness than the pipes manufactured as described above there is used a method according to which a pipe-shaped blank having larger wall thickness and less diameter than the completed thermoplastic pipe is introduced into a cylindrical chamber having an inner surface of substantially the same design as the outer surface of the completed thermoplastic pipe whereupon the blank is softened by means of heating and is expanded to engagement with the inner surface of the chamber by being subjected to an inner pressure from a gas or the like. When manufacturing a thermoplastic pipe of suitable plastic material this expansion of the blank provides for a molecular orientation of the plastic which provide the plastic material with a drastically increased strength. In this way it is thereby possible to manufacture thermoplastic pipes which can be subjected to high inner or outer pressures and in spite thereof can be designed with relatively thin walls, i.e. with a low weight.

A drawback of pipes of the kind manufactured by means of expansion of a blank is that the inner surface of the pipe including the end portion of the pipe at which the sealing ring shall be mounted in an inner groove obtains bad tolerances. This is of course a consequence of the fact that the outer surface of the pipe is defined as to its design by the inner surface of the chamber while the inner surface of the pipe so to say only follows the forming of the outer surface and is itself not positively shaped. The bad tolerances of the inner surface of the pipe and especially the end portion of the pipe bring about difficulties for providing a tight connection of the sealing ring which is positioned in an inner groove in the pipe end portion.

The object of the present invention is to provide a method for manufacturing a thermoplastic pipe by expansion of a blank by means of which the bad tolerances of the end portion of the pipe and thereby the difficulties in providing a tight connection of a sealing ring to an inner groove in said end portion are obviated.

In order to comply with this object the method according to the invention is characterized in that the thermoplastic pipe is at the end portion at which the sealing ring shall be mounted formed with an inner diameter which amounts at least to the diameter at the bottom of the inner groove, that the sealing ring is positioned on a substantially cylindrical surface having a design corresponding to the desired design of the end portion of the completed thermoplastic pipe, that the end portion of the pipe is after the forming of the pipe in the cylindrical chamber pushed over the cylindrical surface and the sealing ring positioned thereon and is heated to a temperature at which the pipe end portion shrinks to engagement with the cylindrical surface and the sealing ring, the sealing ring thereby forming a groove in the wall of the pipe end portion, and that the cylindrical surface is separated from the pipe end portion with the sealing ring remaining in the groove formed in the pipe end portion.

When accomplishing the method according to the invention the pipe end portion is formed around surfaces defining the shape of the inner surface of the end portion of the pipe to accurate tolerances. As the end portion of the pipe is in addition thereto formed directly around the sealing ring there do not appear any problems relating to the tight connection between the end portion of the pipe and the sealing ring.

It is preferred that the pipe is in the cylindrical chamber formed with an end portion having a diameter which increases in two steps in the direction of the end of the pipe, the first step corresponding to the establishment of a socket at the pipe end portion and the second step corresponding to the groove for receiving the sealing ring.

The pipe is preferably manufactured from polyvinyl chloride presenting advantageous properties with regard to said molecular orientation and the capacity of shrinking when being heated subsequent to the manufacturing. When manufacturing the pipe from polyvinyl chloride it is suitable to heat the pipe end portion to a temperature of between 78° and 110° C. after the pipe end portion has been positioned on the cylindrical surface. Preferably the shrinking of the pipe end portion is provided by introducing the pipe end portion into a chamber in which the cylindrical surface is arranged in the form of a mandrel, the pipe end portion being heated in the chamber by means of hot air which is supplied to the chamber or by the fact that heating elements are arranged in the chamber.

An embodiment of the method according to the invention shall be described in the following with reference to the accompanying drawings.

In FIG. 1 there is shown a section of a cylindrical forming chamber in which a blank for manufacturing the pipe is positioned.

Figure 1:
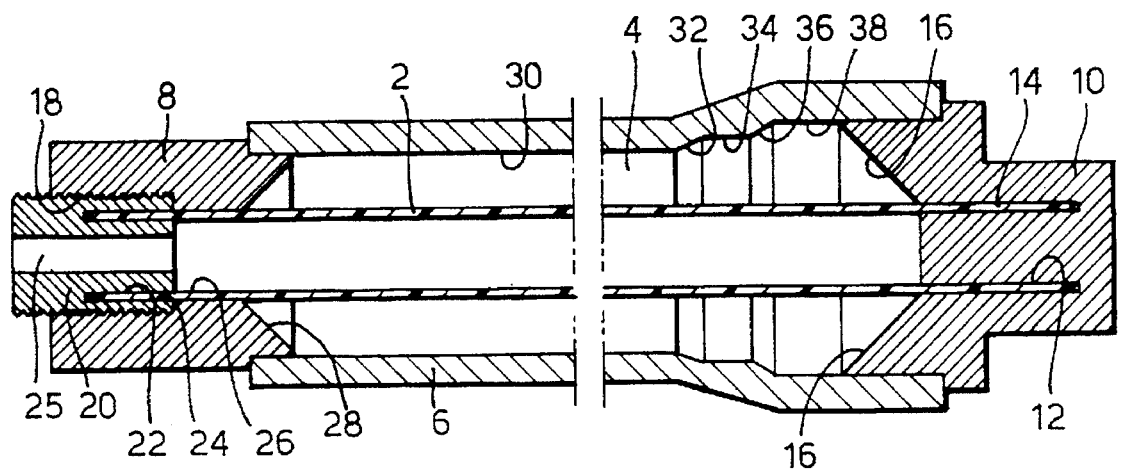

The first manufacturing step when accomplishing the method according to the invention for manufacturing a plastic pipe is conducted by the expansion of a pipe-shaped blank 2 which is positioned in a chamber 4. The chamber 4 is constituted by a substantially cylindrical element and end portions 8 and 10 connected therewith. The end portion 10 has an annular groove 12 receiving the end portion 14 of the pipe shaped blank 2 in such a way that the end portion 14 is fixed in the groove 12. The end portion 10 widens from the groove 12 by a conical surface 16 connecting with the inner surface of the cylindrical element 6. The end portion 8 has a threaded hole 18 open towards the free end and into which a plug 20 provided with an outer thread is screwed. The plug 20 has a groove 22 corresponding to the groove 12 of the end portion 10, in which groove 22 the end portion 24 of the pipe shaped blank 2 is received in such a way that the end portion 24 is fixed in the groove 22. The end portion 8 has a through hole 25 which is connected with the chamber 4 and more precisely with the inner space of the blank 2 positioned therein. Outside the groove 22 the end portion 8 forms a cylindrical surface 26 which merges into a conical surface 28 in turn connecting with the inner surface of the cylindrical element 6. The cylindrical element 6 has an inner surface having a cylindrical portion 30 extending over the main part of the cylindrical element 6. At the end of the cylindrical element 6 positioned to the right in the figure the cylindrical element has a stepwise increasing diameter, a conical portion 32 merging into a cylindrical portion 34 and a conical portion 36 merging into a cylindrical portion 38 connecting with the conical surface 16 of the end portion 10. The cylindrical portion 34 has an inner diameter corresponding to the inner diameter of the socket of the completed thermoplastic pipe while the portion 38 has a diameter corresponding to the diameter at the bottom of the groove in which the sealing ring is positioned in the completed pipe.

Figure 2:
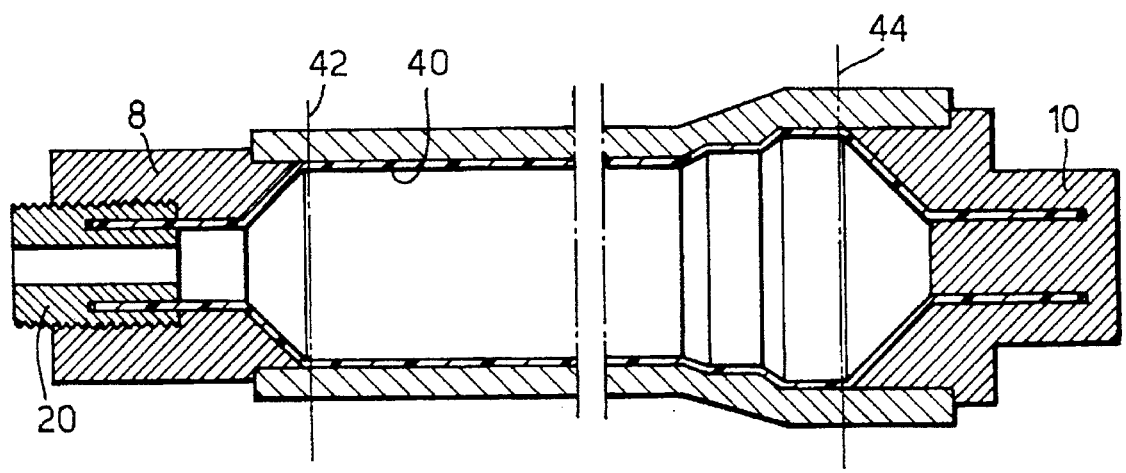
FIG. 2 shows a corresponding section after expansion of the blank.
Figure 3:
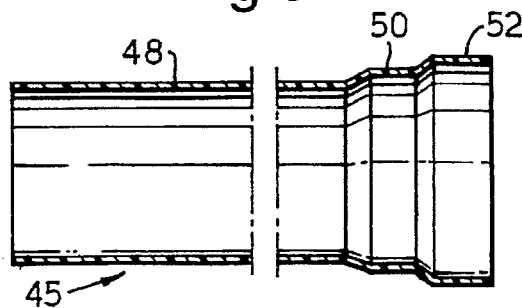
FIG. 3 shows a pipe manufactured according to the method of the invention prior to the final forming stage.

The pipe-shaped blank 2 is heated in any suitable way, for example by submerging the device shown in FIGS. 1 and 2 as a whole into hot water. The pipe-shaped blank 2 is suitably heated to a temperature of 80°–90° C., the temperature being choosen with regard to the properties of the thermoplastic material used. After the pipe-shaped blank 2 has been heated to softening temperature a gas under pressure is supplied through the hole 25 in the plug 20, the pipe shape blank 2 thereby being expanded into contact with the inner surfaces of the cylindrical element 6 and the conical surfaces 16 and 28 of the end portions 10 and 8, respectively. The expansion of the blank 2 provides for a peripheral orientation of the molecules of the plastic material providing for an increased strength of the pipe thus formed in relation to the case that the molecules are randomly orientated. After expansion of the blank 2 the blank has formed the pipe shaped body 40 shown in FIG. 2 which after cooling and solidification is removed from the forming device and after being cut along the dash dotted lines 42 and 44 shown in FIG. 2 constitutes a pipe 46 of the design according to FIG. 3. The pipe 46 has a cylindrical main portion 48 and an end portion having two sections 50 and 52 of stepwise increasing diameters. The section 50 has a diameter corresponding to the diameter of the socket of the completed thermoplastic pipe. The section 52 has an inner diameter corresponding to the diameter of the groove in which the sealing ring of the pipe shall be received.

Figure 4:
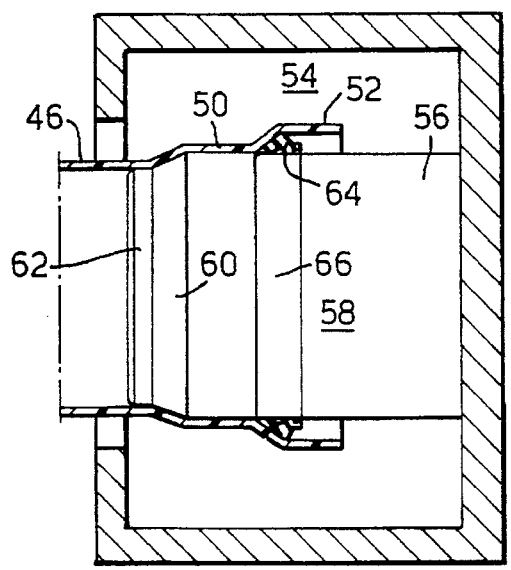
FIGS. 4 and 5 show sections of a chamber and a mandrel positioned therein for conducting the final forming stage of the method according to the invention.
Figure 5:
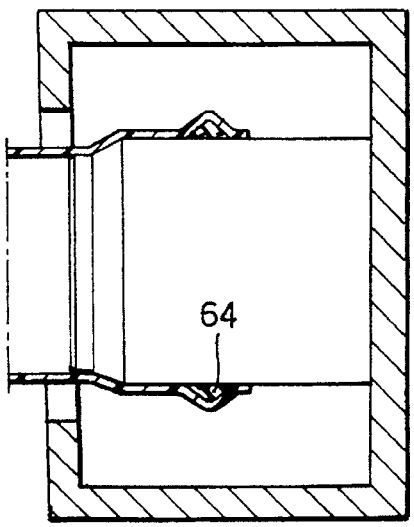

In the next step of the method according to the invention the end portion of the pipe 46 is positioned in a chamber 54 in which a cylindrical mandrel 56 is arranged. The mandrel 56 has a cylindrical portion 58 having an outer diameter corresponding to the inner diameter of the socket of the completed thermoplastic pipe. The free end of the mandrel 56 merges through a conical portion 60 into a portion 62 having the same inner diameter as the main portion of the pipe. On the cylindrical surface 58 of the mandrel 56 there is positioned a sealing ring 64 in a shallow groove 66 formed at the surface of the mandrel and defining the position of the sealing ring. The end portion of the pipe is pushed over the mandrel and the sealing ring 64 as shown in FIG. 4 so that the sealing ring 64 will be positioned in the inner portion of the section 52 of the pipe end portion having the largest diameter. Thereupon the pipe end portion positioned in the chamber 54 is heated by means of hot air or by means of heating elements positioned in the chamber to such a temperature that the unsupported portions of the pipe end portion, i.e. the portion of the pipe end portion 52 positioned outside the sealing ring, will shrink. The shrinking takes place until said portion contacts the sealing ring and the portion of the cylindrical portion 58 of the mandrel 56 positoned outside the sealing ring. When using polyvinyl chloride for manufacturing the pipe the heating can depending on the properties of the polyvinyl chloride be conducted so as to reach a temperature of between 78° and 110° C. By means of the operational step thus described there is provided an accurate connection of the pipe end portion with the sealing ring 64 which makes it possible subsequently to use the pipe end portion for tightly connecting without problems the pipe to another plastic pipe, the spigot end of which is introduced into the socket of the pipe. After shrinking of the outermost end portion of the plastic pipe this has the appearance as shown in FIG. 5. After cooling and solidification the pipe end portion is withdrawn from the chamber, the sealing ring 64 accompanying the pipe end portion being retained in the groove formed around the sealing ring.

The invention can be modified within the scope of the following claims. Especially it is possible to adapt temperatures and additional operational steps to different types of pipes and different types of pipe materials.

I claim:

1. A method for manufacturing a thermoplastic pipe with an end portion having a sealing ring mounted in a groove formed in the pipe end portion, the method comprising the steps of:

a) positioning a thermoplastic tubular blank in a cylindrical chamber having an inner surface of substantially the same shape as the outer surface of the thermoplastic pipe to be formed, the blank having a larger wall thickness and smaller diameter than the thermoplastic pipe;

b) heating the blank to soften the thermoplastic and expanding the blank into engagement with the inner surface of the chamber such that an enlarged intermediate end portion is formed, the inner diameter of the enlarged intermediate end portion being greater than or equal to the inner diameter of the pipe at the bottom of the groove;

c) positioning the sealing ring on a cylindrical surface which corresponds to the desired shape of the end portion of the thermoplastic pipe;

d) positioning the enlarged intermediate end portion over the cylindrical surface and the sealing ring positioned thereon;

e) heating the enlarged intermediate end portion to a temperature at which the enlarged intermediate end portion shrinks into engagement with the cylindrical surface and the sealing ring to form the end portion of the thermoplastic pipe, the sealing ring thereby forming the groove in the wall of the pipe end portion; and f) separating the cylindrical surface from the pipe end portion with the sealing ring remaining in the groove formed in the pipe end portion.

2. The method of claim 1, wherein the thermoplastic pipe is manufactured of polyvinyl chloride.

3. The method of claim 2 further comprising the step of positioning the enlarged intermediate end portion over the cylindrical surface and sealing ring and in a heating chamber, and heating the enlarged intermediate end portion in the chamber by means of hot air.

4. The method of claim 2, wherein the step of heating the enlarged intermediate end portion comprises heating the enlarged intermediate end portion to a temperature of between 78° and 100° C.

5. The method of claim 4 further comprising the step of positioning the enlarged intermediate end portion over the cylindrical surface and sealing ring and in a heating chamber, and heating the enlarged intermediate end portion in the chamber by means of hot air.

6. The method of claim 1, wherein expanding the blank in the cylindrical chamber results in an enlarged intermediate end portion having an inner surface which increases in diameter in two steps towards the end of the pipe, thereby forming a pipe socket with an enlarged intermediate end portion, the first step corresponding to the groove for receiving the sealing ring.

7. The method of claim 6 further comprising the step of positioning the enlarged intermediate end portion over the cylindrical surface and sealing ring and in a heating chamber, and heating the enlarged intermediate end portion in the chamber by means of hot air.

8. The method of claim 6, wherein the thermoplastic pipe is manufactured of polyvinyl chloride.

9. The method of claim 8, wherein the step of heating the enlarged intermediate end portion comprises heating the enlarged intermediate end portion to a temperature of between 78° and 100° C.

10. The method of claim 6, wherein the shape of the cylindrical surface corresponds to the shape of the pipe socket.

11. The method of claim 10 further comprising the step of positioning the enlarged intermediate end portion over the cylindrical surface and sealing ring and in a heating chamber, and heating the enlarged intermediate end portion in the chamber by means of hot air.

12. The method of claim 9, wherein the thermoplastic pipe is manufactured of polyvinyl chloride.

13. The method of claim 12, wherein the step of heating the enlarged intermediate end portion comprises heating the enlarged intermediate end portion to a temperature of between 78° and 100° C.

14. The method of claim 1 further comprising the step of positioning the enlarged intermediate end portion over the cylindrical surface and sealing ring and in a heating chamber, and heating the enlarged intermediate end portion in the chamber by means of hot air.

\* \* \* \* \*